June 3, 1969  J. P. ROBERTS  3,447,797
TELESCOPING, SPRING-LOADED, HYDRAULICALLY DAMPED SHOCK ABSORBER
Filed Dec. 14, 1966  Sheet 1 of 2
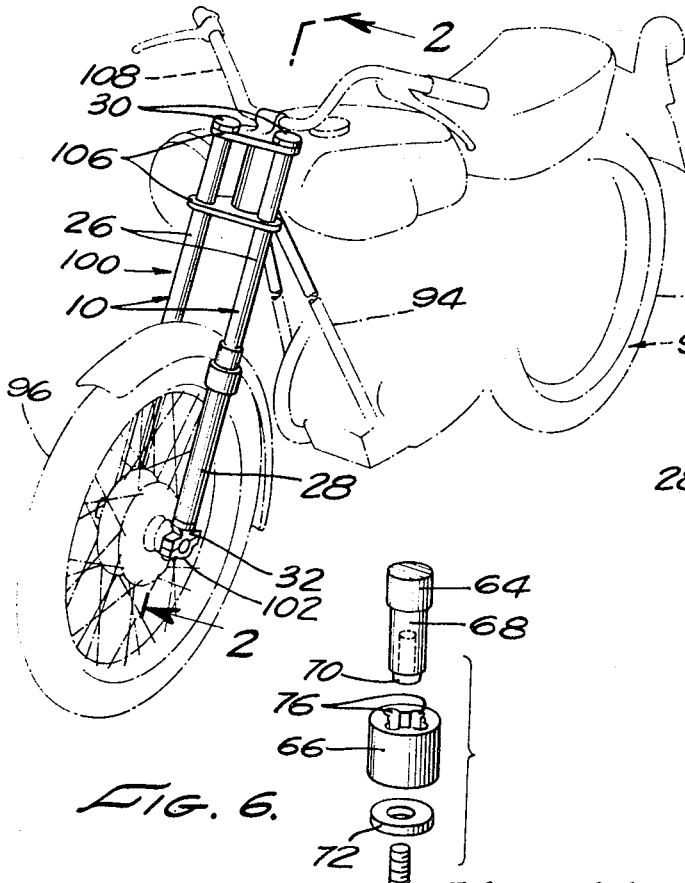
FIG. 1
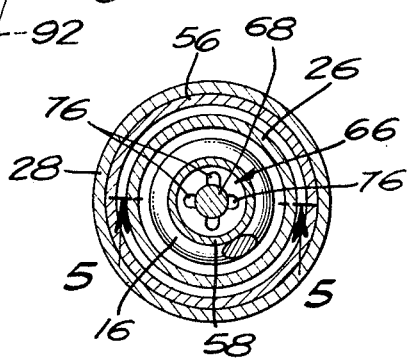
FIG. 6.
FIG. 4.
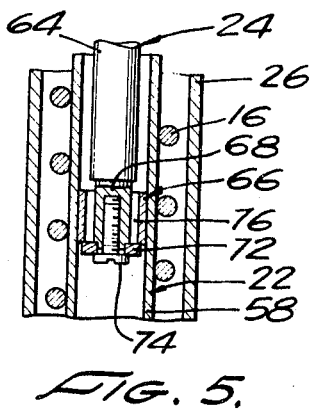
FIG. 5.
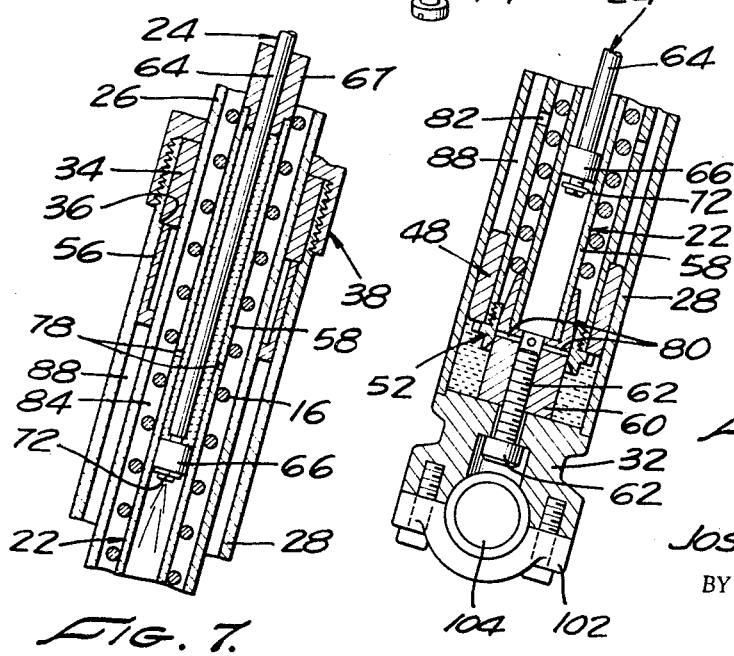
FIG. 7.  FIG. 8.
INVENTOR.
JOSEPH P. ROBERTS
BY R.E. Granger
ATTORNEY

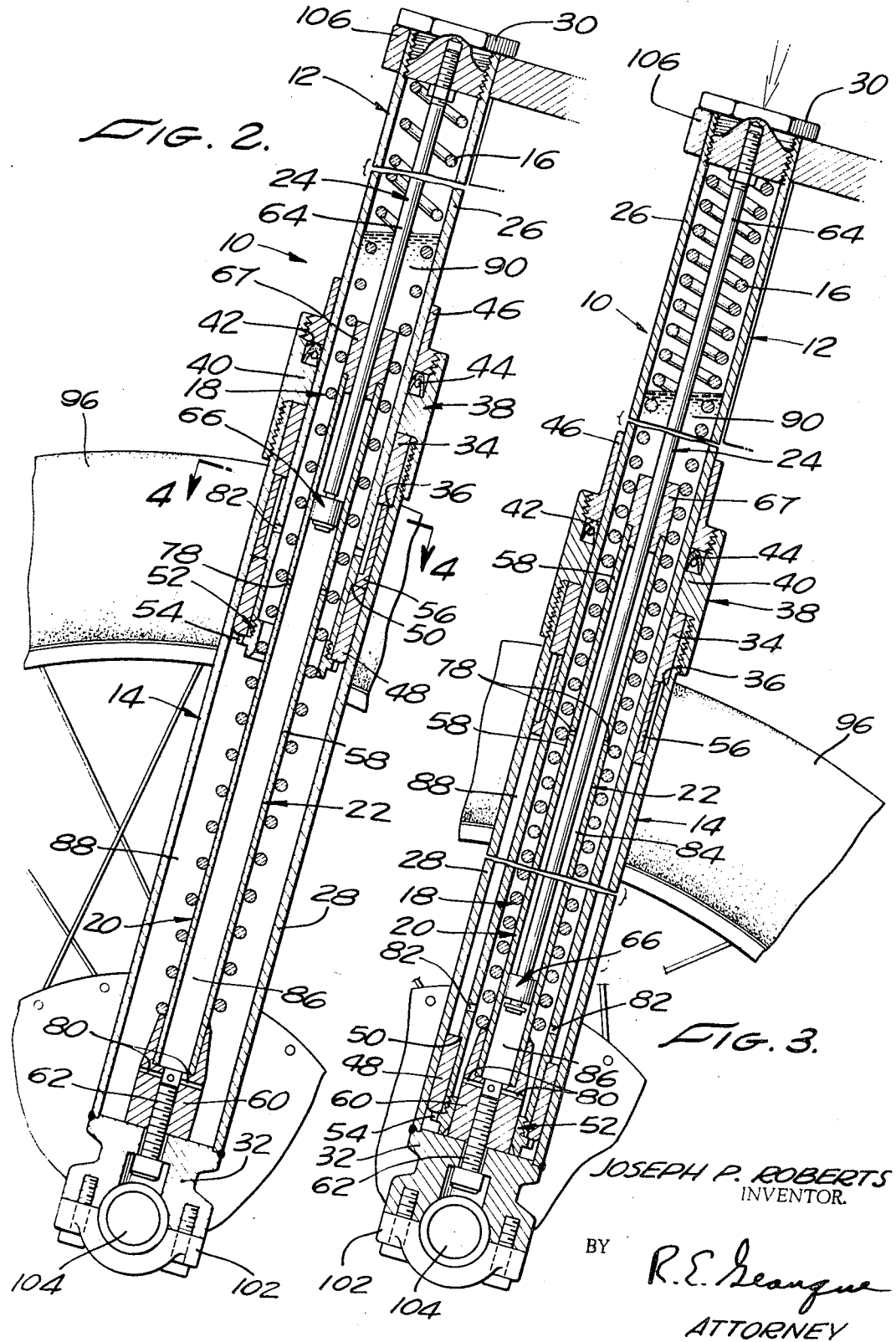

United States Patent Office 3,447,797
Patented June 3, 1969

3,447,797
**TELESCOPING, SPRING-LOADED, HYDRAULI-
CALLY DAMPED SHOCK ABSORBER**
Joseph P. Roberts, Denver, Colo., assignor of one-half
to William T. Smith, Tujunga, Calif.
Filed Dec. 14, 1966, Ser. No. 601,733
Int. Cl. B60g *11/56, 11/26;* F16f *5/00*
U.S. Cl. 267—34                                    7 Claims

ABSTRACT OF THE DISCLOSURE

A telescoping shock absorber is provided for motor driven cycles and the like. The shock absorber has a pair of telescoping tubes containing a hydraulic damper and a surrounding coil spring which extends centrally through the tubes between the ends thereof for yieldably resisting and damping relative longitudinal displacement of the tubes. The hydraulic damper is arranged to impose a minimum viscous drag on relative telescoping movement of the tubes and a maximum viscous drag on relative extension movement of the tubes, whereby contraction of the shock absorber under load is resisted primarily by the shock absorber spring and jarring rebound of the shock absorber after removal of the load is prevented.

---

This invention relates generally to shock absorbers, and, more particularly, to an improved telescoping spring-loaded, hydraulically damped shock absorber.

As will appear from the ensuing description, the shock absorber of the present invention is capable of various applications. However, the absorber is intended primarily for use in the front wheel suspension of certain types of motor driven cycles which are currently enjoying widespread use. Accordingly, the invention will be described in connection with this particular use.

The motor driven cycles referred to are of the class which comprise a front-wheel suspension including a front steering fork assembly having spring-loaded, hydraulically damped telescoping fork legs or struts which straddle the front wheel. The lower ends of these struts are secured to the front wheel axle. The upper end of the steering fork assembly is pivotally mounted on the front end of the cycle frame for steering movement or rotation relative to the frame. Fixed to this steering fork assembly is a handle bar for steering the cycle.

In a typical cycle front wheel suspension of this kind, each telescoping strut of the front steering fork assembly comprises upper and lower slidably telescoping members or tubes containing a hydraulic damping unit or dash pot and a coil spring. The damping unit has a cylinder which is fixed at one end to the outer end of one telescoping tube and a plunger extending from the opposite end of the cylinder which is fixed to the outer end of the other telescoping tube. The damping unit is arranged to exert a viscous drag or retarding force on the tubes during relative extension thereof and to exert only minimal viscous drag on the tubes during telescoping movement thereof. The coil spring within the telescoping tubes yieldably urges the latter to their extended positions and, thereby, yieldably resists relative telescoping movement of the tubes. In a broad sense, therefore, each telescoping strut of such cycle front wheel suspensions comprises a telescoping spring-loaded, hydraulically damped shock absorber, wherein the strut spring accommodates resilient telescoping movement of the strut tubes under load, thus to absorb or cushion road shock, and the hydraulic damping unit retards spring return of the tubes to their extended positions, thus damping vibration and minimizing the extension rebound impact occasioned by full or extreme extension of the tubes.

The existing suspension struts or shock absorbers of the kind under discussion are characterized by certain deficiencies which the present invention seeks to cure. One of these deficiencies resides in the fact that the strut spring acts between the inner end of the hydraulic damping cylinder, that is, the end of the cylinder from which the damping plunger extends, and the outer end of the opposite strut tube. The length of the spring in the fully extended position of the strut tubes, therefore, is only a fraction of the fully extended length of the strut. As a consequence, this spring is substantially fully compressed in the limiting telescoped positions of the strut tubes. In many cases, telescoping movement of the strut tubes is actually limited by engagement or bottoming of the adjacent spring coils. Such bottoming of the spring coils, if it occurs, produces an undesirable impact or jar. In addition, this bottoming of the spring coils results in a maximum spring stroke, i.e. the deflection of the spring between the limiting extended and telescoped positions of the strut tubes, which is relatively short and only a fraction of the maximum stroke length of which the strut tubes are theoretically capable. Such theoretical maximum stroke length of the tubes, of course, is just slightly less than the length of each tube. Because of this short spring stroke, the strut spring must have a relatively high spring rate and is generally required to be prestressed, that is stressed or compressed in the limiting position of extension of the strut tubes, to provide adequate spring support for the cycle and its rider. In other words, a high spring rate and prestressing of the strut spring is necessary to prevent bottoming of the strut when the latter is subjected to normal loading and road shock. Such a high spring rate and prestressing of the front suspension springs of a motor driven cycle, of course, adversely affect the cushioning action of the springs and result in a relatively "hard" ride.

The relatively high spring rate, spring prestress, and short overall stroke length, of the existing front cycle wheel suspension struts or shock absorbers of the kind under discussion give rise to a further significant disadvantage. This disadvantage is two-fold in nature and resides, in part, in the fact that the spring tends to return the strut tubes to their extreme or fully extended positions with a high rate rebound force which often results in a substantial impact upon arrival of the tubes in these positions, and, in part, to the fact that the short stroke length prohibits hydraulic snubbing or cushioning of the impact. The reasons why the strut spring tends to produce high rate rebound extension and impact of the strut tubes are obvious from the earlier discussion. With regard to the hydraulic snubbing action, the hydraulic damping units employed in front cycle wheel suspension struts or shock absorbers of the kind under discussion are commonly arranged in such a way that they produce a regulated or semi-hydraulic locking or snubbing action as the strut tubes approach their limiting or extreme telescoped positions. This semi-hydraulic locking or snubbing action minimizes or cushions the impact which tends to occur upon high rate telescoping movement of the strut tubes to their limiting telescoped positions as the result of extreme road shock. The short stroke length of the existing suspension struts, however, precludes a similar hydraulic snubbing or locking action during relative extension of the struts to their limiting or extreme extended positions. Accordingly, the rider of a motor driven cycle equipped with an existing front wheel suspension is subjected to frequent and undesirable high rate rebound impact or jarring, particularly when traveling over relatively rough terrain.

The present invention provides an improved telescoping spring-loaded, hydraulically damped shock absorber which is ideally suited to replace the front wheel suspension struts or shock absorbers of the existing motor driven cycle front wheel suspensions of the character described and which is not subject to the above noted and other deficiencies of these existing shock absorbers. Briefly, the present shock absorber comprises telescoping members having inner telescoping ends and outer ends, a coil compression spring extending the full length of the telescoping members between the outer ends thereof and seating against these ends to yieldably urge the members to their extended positions, and hydraulic damping means including a hydraulic damping unit extending centrally through the spring and operably connected to the outer ends, respectively, of the members. The damping means are arranged to hydraulically retard relative extension movement of the telescoping members with a viscous drag or retarding force which remains relatively constant throughout a major portion of the relative extension travel of the members and increases to a regulated or semi-hydraulic locking or snubbing force as the members approach their fully extended positions. The damping means are also arranged to impose only a minimal hydraulic drag or retarding action on the telescoping members during telescoping movement thereof, whereby such telescoping movement is resisted substantially only by the shock absorber spring, and to exert a regulated or semi-hydraulic locking or snubbing force as the members approach their fully telescoped positions.

One advantage of the present shock absorber, then, resides in the fact that the absorber spring, in the fully extended positions of the telescoping members, is substantially equal in length to the overall length of these members. Accordingly, the maximum stroke length of the shock absorber is not limited by contacting of the spring coils and may approximate the length of each telescoping member. This increased stroke length, in turn, permits the shock absorber to provide adequate spring support for a motor driven cycle, for example, with a relatively low rate absorber spring which is not prestressed. Accordingly, the present shock absorber exhibits an improved cushioning action and minimizes extension rebound impact. Rebound impact, as well as impact occasioned by full or extreme telescoping movement of the shock absorber are also reduced or eliminated by the semi-hydraulic locking or snubbing actions which occur at the ends of the extension and telescoping strokes of the absorber.

The present shock absorber is thus ideally suited for use as a front wheel suspension strut or shock absorber for front cycle wheel suspensions of the kind described earlier. In this application, the telescoping members of the shock absorber comprise slidably interfitting tubes for connection to the front wheel axle and steering assembly, respectively, of the cycle. These tubes also form part of the hydraulic damping means of the shock absorber. As noted earlier, however, while the present shock absorber is ideally suited for this particular use, it is capable of other applications.

Accordingly, it is a general object of the invention to provide an improved telescoping spring-loaded, hydraulically damped shock absorber of the class described.

A more specific object of the invention is to provide a shock absorber of the character described wherein the absorber spring extends substantially the full length of the absorber, whereby the shock absorber has a maximum stroke length which is unrestricted by contact or bottoming of the absorber spring coils, exhibits superior spring cushioning characteristics, and minimizes or eliminates extension rebound impact.

Another object of the invention is to provide a shock absorber of the character described wherein relative extension movement of the telescoping members of the absorber is hydraulically retarded with a viscous drag or retarding force that remains relatively constant throughout the major portion of the extension travel of the telescoping members and increases to a regulated or semi-hydraulic locking or snubbing force as the members approach their fully extended positions, thus to minimize extension rebound impact.

A related object of the invention is to provide a shock absorber of the character described wherein the absorber spring may be substantially unstressed in the fully extended condition of the absorber, whereby high rate rebound and extension rebound impact are further minimized or eliminated.

A further object of the invention is to provide a shock absorber of the character described wherein the hydraulic damping means permit telescoping movement of the telescoping members with only minimal viscous drag, whereby such movement is resisted substantially only by the absorber spring, and the damping means impose a regulated or semi-hydraulic locking or snubbing force as the telescoping members approach their fully telescoped positions, whereby impact occasioned by full or extreme stroking of the shock absorber is minimized or cushioned in both its extension and telescoping stroking modes.

Yet a further object of the invention is to provide a shock absorber of the character described which is ideally suited for use as a front wheel suspension strut in a front cycle wheel suspension system of the character described and which provides a softer ride and exhibits other riding characteristics which are superior to those of the existing suspension struts of this kind.

A still further object of the invention is to provide a shock absorber and front cycle wheel suspension strut of the character described which are relatively simple in construction, economical to manufacture, reliable in operation, immune to wear, and otherwise ideally suited to their intended purposes.

Other objects, advantages, and features of the invention will become readily evident as the description proceeds, taken in conjunction with the accompanying drawings in which:

FIGURE 1 is a perspective view of a motor driven cycle having a front wheel suspension embodying a pair of the present shock absorbers or front wheel suspension struts;

FIGURE 2 is an enlarged section taken on line 2—2 in FIGURE 1 illustrating one of the shock absorbers in its fully extended condition;

FIGURE 3 is a section similar to FIGURE 2 illustrating the shock absorber in its fully telescoped condition;

FIGURE 4 is a section taken on line 4—4 in FIGURE 2;

FIGURE 5 is a section taken on line 5—5 in FIGURE 4;

FIGURE 6 is an exploded fragmentary perspective view of a portion of a damper plunger embodied in the shock absorber;

FIGURE 7 is a fragmentary section through the shock absorber illustrating, in particular, certain semi-hydraulic locking or snubbing means embodied in the shock absorber for cushioning the impact occasioned by extreme extension of the shock absorber; and FIGURE 8 is a fragmentary section through the shock absorber illustrating, in particular, certain semi-hydraulic locking or snubbing means embodied in the shock absorber for cushioning the impact occasioned by extreme telescoping movement of the shock absorber.

In general terms, the shock absorber 10 of the invention which has been selected for illustration in the drawings comprises a pair of telescoping members 12 and 14 having inner telescoping ends and opposite outer ends. Extending substantially the full length of the telescoping members is a coil compression spring 16. The ends of this spring are operatively engaged with the outer ends of the telescoping members 12, 14, whereby the spring is effective to yieldably urge these members to their extreme or fully extended positions of FIGURE 2. The shock absorber is equipped with hydraulic damping means 18 including a hydraulic damper 20 which extends centrally through the compression spring 16. This damper has a cylinder 22 and a plunger 24 extending from the inner end of the cylinder. The outer end of the damper cylinder 22 is secured to the outer end of the telescoping member 14. The outer end of the damper plunger 24 is secured to the outer end of the telescoping member 12. As noted earlier, and hereinafter explained in detail, the hydraulic damping means 18 are effective to hydraulically retard relative extension movement of the telescoping members 12, 14 with a viscous drag or retarding force which remains relatively constant throughout a major portion of the relative extension travel of the members and increases to a regulated or semi-hydraulic locking force as these members approach their extreme or fully extended positions. The damping means impose only minimal viscous drag on the telescoping members during relative telescoping movement thereof, until these members approach their extreme or fully telescoped position of FIGURE 3. At this point, the damping means produce a regulated or semi-hydraulic locking or snubbing force which resists further telescoping movement of the members. Because of the relatively long length of the compression spring 16, the latter may have a relatively low spring rate and may be relatively unstressed in the fully extended condition of the shock absorber, whereby high rate extension rebound and extension rebound impact are minimized or eliminated. In addition, the semi-hydraulic locking or snubbing action which occurs as the shock absorber approaches its fully extended condition cushions any rebound impact which does tend to occur. The semi-hydraulic locking or snubbing action which occurs upon telescoping movement of the shock absorber to its extreme or fully telescoped condition minimizes or cushions the impact which tends to occur in this limiting mode of deflection of the shock absorber. As will appear from the ensuing description, these and other advantages of the present shock absorber derive from the fact that the spring 16 surrounds the damper cylinder 22 and extends the full length of the absorber.

Referring now in greater detail to the shock absorber, the telescoping members 12 and 14 comprise slidably interfitting tubes 26 and 28. In the particular shock absorber illustrated, the tube 26 slides within the tube 28.

The outer end of the tube 26 is closed by an end cap 30 which is threaded in the tube. The cap may be sealed to the tube by a seal ring, or the like, for reasons to appear presently.

At the outer end of the tube 28 is an end cap 32 which is brazed or otherwise joined to the tube so as to close the tube end. As noted earlier, the illustrated shock absorber is designed for use as a front wheel suspension strut for front cycle wheel suspensions. In this application, the end cap 30 comprises one-half of an axle clamp which is adapted for connection to one end of the front wheel axle.

Within the inner end of the outer tube 28 is a tubular slide bearing 34. One end of this bearing seats axially against an annual shoulder 36 within the tube. The opposite end of the bearing is substantially flush with the end of the tube. Threaded on the inner end of the tube 28 is a bearing retainer nut 38 having, intermediate its ends, an annular internal shoulder 40 which seats axially against the adjacent end of the slide bearing 34. The slide bearing 34 is thus axially fixed between the shoulders 36, 40 and relative to the outer tube 28. Tube 26 extends slidably through the retainer shoulder 40 and the slide bearing 34. Extending axially into the end of the bearing retainer 38 is an annular coaxial seal recess 42 containing a seal rig 44. This seal ring is retained in the seal recess by a seal retainer 46 which is threaded in the retainer nut 38. Seal ring 44 provides a sliding fluid seal between the tubes 26, 28.

Surrounding the inner end of the tube 26 is a second tubular slide bearing 48. One end of the slide bearing seats axially against an external annular shoulder 50 on the tube. Threaded in the inner end of the tube 26 is a combined bearing retainer nut and bottoming restrictor sleeve 52 having an external flange 54 which seats axially against the opposite end of the slide bearing 48. Slide bearing 48, therefore, is axially fixed between the shoulder 50, 54 and relative to the inner tube 26. Bearing 48 slides within the outer tube 28.

Slide bearings 34, 48 thus cooperate to support the tubes 26, 28 for relative axial movement between their extreme or fully extended positions of FIGURE 2 and their extreme or fully telescoped positions of FIGURE 3. Extension movement of the tubes is limited by simultaneous engagement of both slide bearings with the ends of an intervening extension limit spacer 56 which slides on the inner tube between the bearings. Telescoping movement of the tubes is limited by bottoming contact of the outer tube end cap 32 and the inner tube bearing nut 52.

Hydraulic damper 20 extends centrally through the tubes 26, 28 and the spring 16. The cylinder 22 of this damper comprises a damper tube 58 and an enlarged bottoming restrictor body 60 coaxially brazed on one end of the damper tube. Spring 16 seats at one end against the end cap 30 and at the other end against the adjacent end of the restrictor body 60, as shown. The restrictor body 60, and thereby the damper tube 58, are secured to the outer sleeve end cap 32 by a cap screw 62 which extends centrally through the cap and is centrally threaded in the restrictor body. Restrictor body 60 is externally dimensioned to slidably receive the restrictor sleeve 52 on the inner telescoping tube 26. As will appear presently, the restrictor sleeve and the slide bearing 48 define annular restrictor means on the inner end of the inner telescoping tube 26 which cooperate with the restrictor body 60 to produce a semi-hydraulic locking or snubbing action as the tubes approach their telescoped positions. The end of the restrictor body 60 adjacent the damper tube 58 is externally conically tapered to guide the restrictor sleeve over the body during extreme telescoping movement of tubes 26, 28. The damper plunger 20 includes a shaft 64 and a piston 66. The outer end of the plunger shaft 64 extends slidably through a bearing 67 fixed in the outer end of the damper tube and is coaxially threaded in the inner telescoping tube end cap 30. The inner end of the plunger shaft 64 has a reduced extension 68 (FIGURE 6), the inner extremity of which is further reduced at 70. Plunger piston 66 is slidable on the plunger shaft extension 68 and has a close sliding fit in the damper tube 58. Fitted on the reduced extremity 70 of the plunger shaft 64 is a washer 72. A cap screw 74 threaded in the inner end of the shaft clamps the washer tightly against the shoulder which is defined at the juncture of the shaft 68 and the reduced shaft extension 70. The external diameter of this washer will be seen to be somewhat smaller than the internal diameter of the damper tube 58. Extending axially through the piston 66 are a number of fluid ports or passages 76.

As will appear from the ensuing description, the plunger piston 66 is slidable on the plunger shaft extension 68 between its position of FIGURES 2 and 3. In the position of FIGURE 3, the piston seats axially against the shoulder at the end of the plunger shaft extension. The piston is then spaced axially from the plunger shaft washer 72, and the piston passages 76 are open to relatively unrestricted hydraulic fluid flow therethrough. In the position of FIGURE 2, the piston 66 seats axially against the washer 72 which effectively seals the piston passages 76 against hydraulic fluid flow. Thus, the piston and washer together define check valve means for permitting flow through the piston passages 76 in one direction only.

Opening through the wall of the damper tube 58, a distance inwardly of the tube bearing 67, are a number of relatively small hydraulic fluid ports 78. A number of relatively large hydraulic fluid ports 80 open through the restrictor body 60. Large ports 82 open through the inner end of the inner telescoping tube 26.

The plunger piston passages 76 communicate the two hydraulic chambers 84 and 86 within the damper tube 58 at opposite sides of the plunger piston 66. The damper cylinder ports 78, 80 communicate the chambers 84, 86 to the annular hydraulic fluid chamber 88 defined between the telescoping tubes 26, 28 and the damper cylinder 22. The inner telescoping tube ports 82 provide free communication between the portions of the chamber 88 located internally and externally of the inner teleescoping tube 26. The several fluid chambers 84, 86 and 88 are filled with hydraulic fluid 90 to the level indicated in the drawings.

At this point, the operation of the shock absorber 10 is obvious. In the normal unloaded condition of the shock absorber, the absorber spring 16 yieldably retains the telescoping tubes 26, 28 in their extended positions of FIGURE 2 wherein the slide bearings 34, 48 seat axially against opposite ends of the intervening extension limit spacer 56. This spacer limits relatives extension of the tubes in such a way that the tubes, in their fully extended positions, overlap sufficiently to provide the shock absorber with desired bending strength. In this extended condition of the shock absorber, the damper tube 58 and plunger 24 are extended to a position wherein the plunger piston 66 is located adjacent, but is preferably spaced from the damper tube bearing 67.

Assume now that the shock absorber is axially loaded with a compressive force. This force telescopes the tubes 26, 28, as well as the damper cylinder 22 and plunger 24, against the yieldable force of the absorber spring 16. During this compression of the shock absorber, the hydralic fluid 90 within the damper cylinder 22 urges the damper piston 66 to its position of FIGURE 3 on the damper plunger shaft 64. In this position, the piston passages 76 are open to relatively unrestricted hydraulic fluid flow therethrough from cylinder chamber 86 to cylinder chamber 84. As a consequence, telescoping movement of the damper cylinder 22 and plunger 24 occasioned by compressive loading of the shock absorber results in hydraulic fluid flow from the cylinder chamber 86 to the cylinder chamber 84 through the piston passages 76 and from the cylinder chamber 86 to the outer hydraulic fluid chamber 88 through the large cylinder ports 80. The passages 76 and ports 80 are dimensioned to permit relatively unrestricted hydraulic fluid flow from the cylinder chamber 86 during telescoping movement of the damper cylinder 22 and plunger 24. Accordingly, compression of the shock absorber is resisted substantially only by the absorber spring 16.

However, as the shock absorber approaches the limit of its compression stroke, the bottoming flow restrictor sleeve 52 on the inner telescoping tubing 26 slides over the restrictor body 60 at the outer end of the outer telescoping tube 28 and past the fluid ports 80 in the restrictor body. At this point, hydraulic fluid is trapped within the annular space defined in the outer end of the outer telescoping tube 28 by the inner tube slide bearing 48, restrictor sleeve 52, outer tube 28, tube end cap 32 and restrictor body 60. Sufficient clearance is provided between the sliding surfaces of these parts to enable restricted leakage of the trapped fluid from the annular space as compression of the shock absorber continues. This restricted leakage of the trapped hydraulic fluid develops a regulated or semi-hydraulic locking or snubbing force as the shock absorber approaches the limit of its compression stroke and serves to minimize or cushion impact of the telescoping members 12, 14 at this end of the stroke. Preferably, the outer end of the damper cylinder 22 and the damper plunger 24 are axially spaced a distance, as shown, in the extreme or fully compressed condition of the shock absorber. It is now obvious, therefore, that during compression of the shock absorber, telescoping movement of the telescoping members 12, 14 is resisted substantially only by the absorber spring 16 during the major portion of their relative telescoping travel, and such relative telescoping movement is restricted, in addition, by a regulated or semi-hydraulic locking or snubbing force as the members approach the limit of their telescoping travel.

Assume next that the compression load on the shock absorber 10 is relieved or removed. The telescoping members 12, 14 are then urged toward their extended positions of FIGURE 2 by the currently compressed absorber spring 16. Under these conditions, the damper cylinder 22 and plunger 24 undergo relative extension, and the force of the hydraulic fluid within the cylinder chamber 84 against the plunger piston 66 urges the latter to its position of FIGURE 2 against the plunger washer 72. This action effectively seals the piston passages 76 against hydraulic fluid flow therethrough. Hydraulic fluid is now drawn from the outer chamber 88 into the cylinder chamber 86 through the large cylinder ports 80, and the hydraulic fluid within the cylinder chamber 84 is expelled through the restricted ports 78 in the damper tube 58 into the outer chamber 88. Ports 78 are dimensioned to restrict such fluid flow from the cylinder chamber 84 and thereby retard, with a viscous drag force, spring return of the telescoping members 12, 14 to their extended positions of FIGURE 2. The damping means 20, therefore, are effective to impose a viscous drag force on the extending telescoping members which remains relatively constant throughout the major portion of their relative extension travel.

As the shock absorber approaches the limit of its extension stroke, the damper piston 66 travels over and past the damper cylinder ports 78. Hydraulic fluid is then trapped in the space defined by the damper tube 58, damper tube bearing 67, and damper piston 66. Sufficient clearance is provided between the piston and damper tube to permit restricted leakage of the trapped fluid from the space during final extension of the shock absorber. This controlled leakage of the trapped fluid provides a regulated or semi-hydraulic locking or snubbing force which minimizes or cushions the impact occasioned by spring return of the telescoping members 12, 14 to their extreme or fully extended positions. It is now evident, therefore, that the hydraulic damping means 20 retards spring extension of the shock absorber 10 with a viscous drag force which remains relatively constant throughout the major portion of the relative extension travel of the telescoping members 12, 14 and increases to a semi-hydraulic snubbing or locking force as these members approach their fully extended positions, thus to minimize or cushion extension rebound impact of the members.

A significant feature of the invention resides in the fact that the absorber spring 16 encircles the damper cylinder 22 and extends substantially the full length of the telescoping members 12, 14. Accordingly, compression of the telescoping members is not limited by contact or bottoming of the adjacent spring coils, whereby the present shock absorber has a substantially greater total deflection travel between its fully extended and fully compressed conditions than conventional shock absorbers of this kind. This total deflection travel, for example, is just slightly less than the individual lengths of the telescoping members. In addition, this increased total deflection travel of the shock absorber permits the use of a relatively low rate absorber spring which may be substantially unstressed or compressed in the fully extended positions of the telescoping members. This, in turn, improves the cushioning action of the shock absorber and further reduces the extension rebound impact of the telescoping members.

It is now obvious that the present shock absorber may be employed for a variety of shock absorbing or cushioning applications. As noted earlier, however, the shock absorber is intended primarily for use in a front wheel suspension for a motor vehicle cycle 92 of the kind illustrated in FIGURE 1. Cycle 92 is conventional except for its front wheel suspension and, accordingly, need not be described in detail. Suffice it to say that the cycle has a frame 94 supported on a front wheel 96 and a rear wheel 98. The front wheel suspension comprises a front steering fork 100 which is pivotally attached to the front end of the frame for steering movement of the fork relative to the frame. The legs or suspension struts of this steering fork are provided by a pair of the present shock absorbers 10.

In this application, the end caps 32 of the outer telescoping tubes 28 of the shock absorbers or suspension struts 10 comprise axle clamp members to which are bolted mating clamp caps 102. The mating clamp members and caps receive therebetween and are firmly clamped to the ends of the front cycle wheel axle 104. The inner telescoping tubes 26 of the shock absorbers or suspension struts 10 extend through and are rigidly secured to steering brackets 106 of the front cycle steering fork 100. A handle bar 108 is mounted on a front steering assembly for turning the latter to steer the cycle.

It is now apparent, therefore, that in the cycle application under consideration, the shock absorbers or suspension struts 10 resiliently support the cycle frame 94 on the front cycle wheel 96. These struts exhibit the superior shock absorbing and cushioning characteristics described earlier whereby a motor driven cycle equipped with the present struts has superior riding characteristics. In this regard, it is obvious that the low rate springs, and unstressed or uncompressed condition of the springs in the fully extended condition of the struts, permitted by the invention, afford the cycle with a much "softer" ride than do conventional shock absorbers or suspension struts and minimize extension rebound impact. Moreover, the semi-hydraulic locking or snubbing actions which occur in the present suspension struts cushion the impact which tend to occur during both extreme extension and extreme compression of the struts, rather than only extreme compression impact, as do the existing struts. According to the preferred practice of the invention, the present shock absorbers are dimensioned so that they may be quickly and easily substituted for those on the existing cycles without modification of the cycles.

While the instant invention has been shown and described herein what is conceived to be the most practical and preferred embodiments, it is recognized that departures may be made therefrom in the scope of the invention, which is therefore not to be limited to the details disclosed herein, but is to be afforded the full scope of the claims.

What is claimed is:

1. A shock absorber comprising:
   inner and outer telescoping tubes having open inner telescoping ends and closed outer ends;
   said tubes being relatively axially movable between limiting extended and telescoped positions;
   a compression coil spring extending centrally through said tubes between said outer ends thereof and substantially the full length of said shock absorber for yieldably urging said tubes to said extended positions and yieldably resisting relative telescoping movement of said tubes to said telescoped positions;
   hydraulic damping means acting between said tubes for retarding relative extension of said tubes with a viscous retarding force while permitting substantially hydraulically unretarded telescoping movement of said tubes;
   said tubes being slidably sealed to one another;
   said damping means comprising a cylinder member having inner and outer ends, a plunger member having an inner end mounting a piston slidable in said cylinder member and an outer end slidably sealed to and extending from the inner end of said cylinder member, means securing the outer extremities of said members to the closed outer ends of said tubes, respectively, whereby said members undergo relative axial movement during relative axial movement of said tubes, there being a first chamber in said cylinder member at one side of said piston toward which said piston moves during relative extension movement of said tubes, a second chamber in said cylinder member at the opposite side of said piston toward which said piston moves during relative telescoping movement of said tubes, and a third annular chamber about said members between the latter and said tubes, hydraulic fluid in said chambers restricted port means communicating said first and third chambers, relatively large port means communicating said second and third chambers, relatively large passage means in said piston communicating said first and second chambers, and check valve means associated with said passage means for permitting relatively unrestricted hydraulic fluid flow through said passage means from said second chamber to said first chamber and blocking reverse fluid flow through said passage means; and
   said spring encircling and extending substantially the full length of said members between said outer extremities thereof.

2. A shock absorber according to claim 1 wherein:
   said restricted port means open through the wall of said cylinder member a distance from the end of the latter member toward which said piston moves during relative extension movement of said tubes and said members accommodate restricted hydraulic fluid leakage therebetween, whereby said damping means provide semi-hydraulic locking means for retarding relative extension of said tubes with a viscous snubbing force greater than said retarding force as said tubes approach said extended positions; and
   said damping means further comprise an enlarged restricter body at the other end of said cylinder member and annular restrictor means at the inner end of said inner tube which slidably engages the inner wall of said outer tube and slides over said restrictor body as said tubes approach said telescoped positions, whereby said damping means provide semi-hydraulic locking means for retarding relative telescoping movement of said tubes with a viscous snubbing force greater than said retarding force as said tubes approach said telescoped positions.

3. A front wheel suspension strut for a motor driven cycle of the character described comprising:
   inner and outer telescoping tubes having open inner telescoping ends and closed outer ends;
   a first slide bearing fixed within the inner end of said outer tube and slidably receiving said inner tube;
   a second slide bearing surrounding and fixed to the inner end of said inner tube and slidably engaging said outer tube;
   said tubes being relatively axially movable between limiting extended and telescoped positions;
   a cylinder member extending centrally through said tubes and having inner and outer ends;
   means securing the outer end of said cylinder member to the closed outer end of said outer tube;
   a plunger member having an inner end mounting a piston slidable in said cylinder member and an outer end slidably sealed to and extending from the inner end of said cylinder member;
   means securing the outer end of said plunger member to the closed outer end of said inner tube;
   said members undergoing relative axial movement during relative axial movement of said tubes;
   said cylinder member including an enlarged restrictor body at the outer end of said cylinder member and adjacent the closed outer end of said outer tube;
   a compression coil spring surrounding said members and seating at one end against the closed outer end of said inner tube and at its opposite end against the adjacent end of said restrictor body, said spring yieldably urging said tubes toward said extended positions and yieldably resisting relatively telescoping movement of said tubes toward said telescoped positions;

a restrictor sleeve fixed to the inner end of said inner tube and slidable over said restrictor body as said tubes approach said telescoped positions;

there being a first chamber in said cylinder member at one side of said piston toward which said piston moves during relative extension movement of said tubes, a second chamber in said cylinder member at the opposite side of said piston toward which said piston moves during relative telescoping movement of said tubes, and a third annular chamber about said members between the latter and said tubes;

hydraulic fluid in said chambers;

restricted port means opening through the wall of said cylinder member a distance from the end thereof toward which said piston moves during relative extension movement of said tubes and communicating said first and third chambers;

relatively large port means communicating said second and third chambers;

relatively large passage means in said piston communicating said first and second chambers;

check valve means associated with said passage means for permitting relatively unrestricted hydraulic fluid flow through said passage means from said second chamber to said first chamber and blocking reverse hydraulic fluid flow through said passage means; and means for securing the outer closed ends of said tubes to the front steering assembly and the front wheel axle, respectively, of said cycle.

4. A shock absorber comprising:

a pair of telescoping tubes having open longitudinally inner telescoping ends and closed longitudinally outer ends;

means slidably sealing said telescoping tube ends to one another;

a hydraulic damper extending centrally through said tubes including a damper cylinder secured at its longitudinally outer end to the outer end of one tube, and a plunger having a piston slidable in said cylinder, and a rod secured at its longitudinally inner end to said piston and at its longitudinally outer end to the outer end of the other tube, means slidably sealing the inner end of said cylinder to said plunger, there being a first chamber in said cylinder at one side of said piston toward which said piston moves during relative telescoping movement of said tubes, a second chamber in said cylinder at the opposite side of said piston toward which said piston moves during relative extension movement of said tubes, and a third annular chamber about said damper between the latter and said tubes, hydraulic fluid within said chambers, a spring action between said tubes for yieldably resisting relative telescoping movement of said tubes, there being first passage means of relatively large effective area at the outer end of said damper cylinder communicating said first and third chambers and second passage means of relatively small effective area adjacent the inner end of said cylinder communicating said second and third chambers, whereby said damper imposes minimum hydraulic retarding action on relative telescoping movement of said tubes and maximum hydraulic retarding action on relative extension movement of said tubes.

5. A shock absorber according to claim 4 wherein:

said damper includes means for restricting said second passage means during relative telescoping movement of said tubes and prior to arrival of said tubes at their fully extended position, thereby to produce an increased hydraulic retarding action on relative extension movement of said tubes as said tubes approach their fully extended positions.

6. A shock absorber according to claim 5 including:

check valve means on said plunger which open to permit relatively unrestricted flow of said hydraulic fluid from said first chamber to said second chamber during relative telescoping movement of said tubes and which close to permit relatively restricted flow only of said hydraulic fluid from said second chamber to said first chamber during relative extension movement of said tubes.

7. A shock absorber according to claim 4 wherein:

said spring comprises a coil spring surrounding said damper and extending longitudinally through said third chamber between the outer ends of said tubes.

References Cited

UNITED STATES PATENTS

| 1,033,348 | 7/1912 | Rimailho | 267—34 |
| 3,046,001 | 7/1962 | Schultze | 267—64 |
| 3,046,002 | 7/1962 | Schmitz | 267—64 |

FOREIGN PATENTS

| 281,596 | 7/1928 | Great Britain. |

ARTHUR L. LA POINT, *Primary Examiner.*

D. F. WORTH, *Assistant Examiner.*

U.S. Cl. X.R.

267—64